Figure 1:
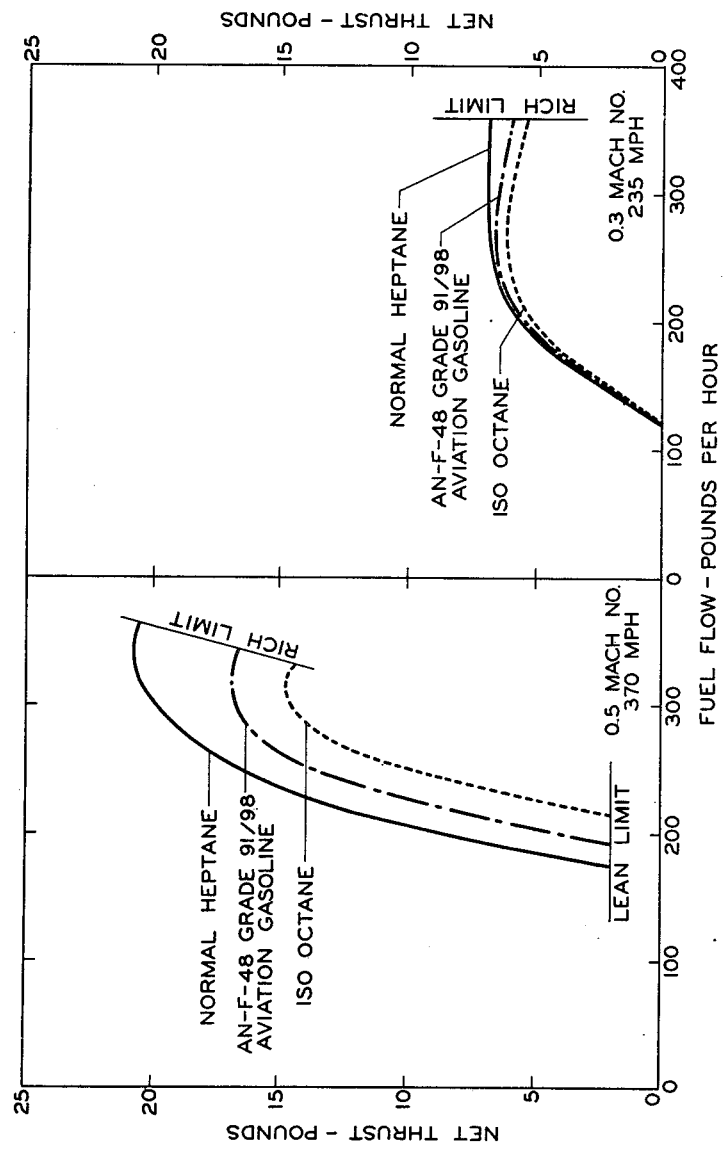

Jan. 4, 1955   R. M. SCHIRMER ET AL   2,698,512
METHOD OF OPERATING RAM-JET ENGINES
Filed April 4, 1949   2 Sheets-Sheet 1

INVENTORS
R. M. SCHIRMER
S. C. BRITTON
BY
ATTORNEYS

INVENTORS
R. M. SCHIRMER
S. C. BRITTON
BY Hudson and Young
by Donald J. Quigg
ATTORNEYS

United States Patent Office 2,698,512
Patented Jan. 4, 1955

2,698,512

METHOD OF OPERATING RAM-JET ENGINES

Robert M. Schirmer and Sylvester C. Britton, Bartlesville, Okla., assignors to Phillips Petroleum Company, a corporation of Delaware Application April 4, 1949, Serial No. 85,358

16 Claims. (Cl. 60—35.4)

This invention relates to jet engines. In one of its more specific aspects it relates to the operation of continuous-flow jet engines. In another of its more specific aspects it relates to the operation of ram jet engines.

This application is a continuation-in-part of our U. S. application, Serial No. 794,427, filed December 29, 1947.

The ram jet engine is the simplest known power plant for aircraft. Its working cycle is essentially the same as that of the turbo-jet engine. One distinct difference in the operation of the two types of jet engines may be found, however, upon study of the compression steps utilized by each engine. Compression for the turbo-jet engine is furnished by a gas turbine-driven compressor which provides a stream of air to the forward portion of a combustion chamber at a desired velocity. As is obvious, control of the flow of air through a turbo-jet engine can be rather rigidly controlled so as to control the compression within the combustion chamber. The operation of ram jet engines differs from the operation of turbo-jet engines in that the air flow through the combustion chamber is controlled by the speed of the ram jet engine moving through the air. Compression for the ram jet engine is produced by utilizing the ramming effect of the oncoming air and inherent fuel combustion problems are aggravated by the lack of air flow control.

It has heretofore been believed that hydrocarbons do not vary sufficiently in their burning characteristics to make a material difference in the operation of any given jet engine. For that reason emphasis was placed upon the development of jet engines having such a structure as would overcome the operational difficulties which were encountered. So far, operational difficulties have been only partially overcome by engine design.

A conventional ram jet engine comprises three main parts. One of those parts is a diffuser in which the velocity of incoming air is reduced to the combustion chamber inlet speed. Part of the velocity head (kinetic energy) of the air stream is transformed into pressure head (potential energy) as measured by an increase in static pressure in the diffuser. A second engine part is the combustion chamber which is provided downstream of the diffuser and receives incoming air and fuel which is burned therein to increase the temperature of the air and resulting combustion gases within the combustion chamber. An obstruction may be placed in the combustion chamber stream to provide in its wake a highly turbulent low velocity region often designated as a flame holding area. The third engine part is a jet nozzle which is provided in the downstream end of the combustion chamber and transforms pressure energy of the end gases from the combustion chamber into kinetic energy so as to result in high exhaust velocity and a corresponding drop in temperature and pressure.

Fuel which is injected into the combustion zone of the ram jet engine is initially ignited therein by a spark producing device, such as a conventional spark plug, which may be mounted in the wall of the combustion chamber. Fuel which is subsequently supplied to the combustion chamber may be ignited by the flame resulting from the burning of previously injected fuel or by the heat from hot combustion gases within the combustion chamber. Air and combustion gases within the combustion chamber are heated by the heat of combustion and are exhausted from the combustion chamber through the rearwardly extending exhaust duct or jet nozzle at an exit velocity higher than the flying speed of the engine. The thrust produced thereby equals the gas mass flowing through the exhaust duct times its increase in speed, according to the law of momentum.

Complex combustion problems more than compensate for the mechanical simplicity of the ram jet engine. We have found that as flying speed of the engine increases the severity of conditions for the propagation of flame is also increased. Hydrocarbon fuels do not, as was heretofore believed, burn with equal stability and efficiency under the conditions of increased severity. We have found that a method of operating a ram jet engine with conventional jet fuels is far inferior to a method of operating the same engine with a special hydrocarbon fuel which is designed to greatly reduce or obviate many of the operational problems of the ram jet engine as is hereafter described.

Ordinarily as the velocity of fuel and air flow through the engine increases, the combustion zone is carried further and further to the rear of the combustion chamber. The flame front often tends to fluctuate back and forth in the combustion chamber and occasionally reaches a point at which combustion will no longer be supported and is extinguished. The movement of the flame front back and forth in the combustion chamber is better known as "cycling." The point at which combustion will no longer be sustained is known as the "blow-out" or "cut-out" point. We have found that cycling is the result, to a large extent, of unstable burning of the fuel and is greatly reduced by the method hereafter described.

A high frequency pulsation phenomenon is also commonly encountered in the operation of ram jet engines. Such high frequency pulsations are often quite audible in these engines. This high frequency pulsation phenomenon is well known by the term "resonance."

Resonance indicates pressure or temperature fluctuations within the burning fuel charge. These fluctuations seriously affect the power output of the engine. We have found that resonance also may be controlled to a large extent by the operation of a ram jet engine with a fuel which has heretofore not been used for the operation of ram jet engines.

An object of this invention is to provide an improved method for operating ram jet engines. Another object of this invention is to provide a method for extending the operational limits of ram jet engines. Another object of the invention is to increase combustion efficiency in ram jet engines. Another object of the invention is to reduce cycling in ram jet engines. Another object of the invention is to reduce resonance in ram jet engines. Another object of the invention is to provide an improved fuel for use in ram jet engines. Another object is to provide a method for decreasing the coke deposition in prevaporizer systems of continuous flow combustion engines. Other and further objects and advantages will be apparent upon study of the accompanying disclosure and drawings.

Figure 2:
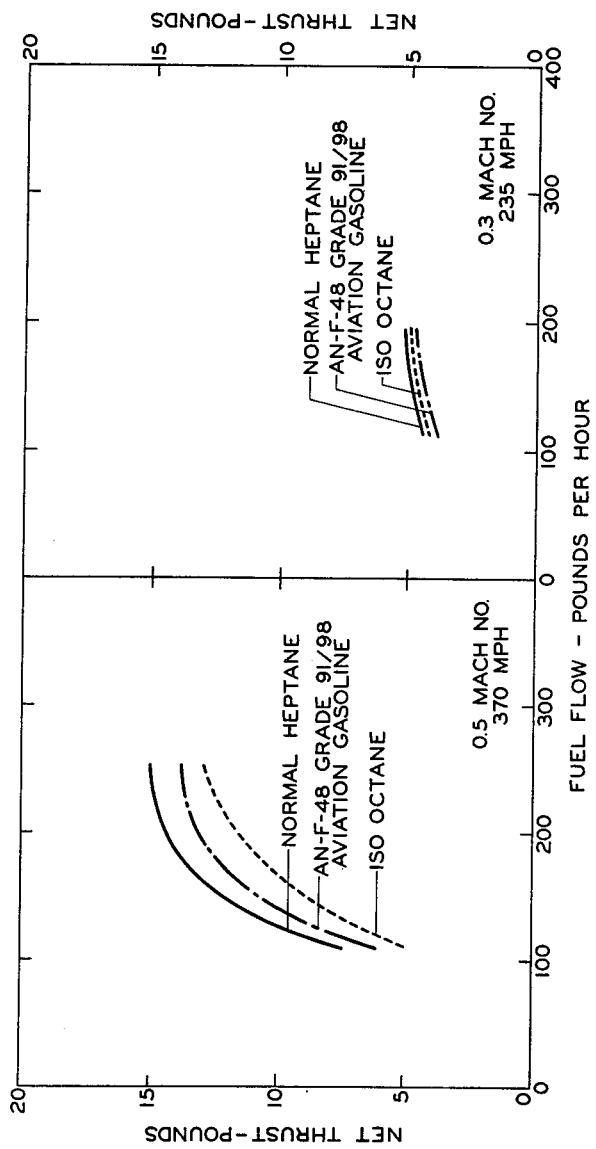

Figures 1 and 2 are graphs illustrating the comparative results of operating ram jet engines A and B under different conditions of operation utilizing three different fuels.

We have found that the assumption that all hydrocarbons burn with such a standard velocity that the operation of a ram jet engine is not materially affected thereby is entirely erroneous. Broadly speaking our invention resides in the operation of ram jet engines with a fuel which comprises essentially hydrocarbons of which at least 50 per cent by volume are normal paraffins. We have found that by operating ram jet engines with such a normal paraffin fuel many of the inherent operational difficulties of such an engine are overcome to a large extent. Much of the improvement in the operation of ram jet engines by our method is believed to be the result of the greater combustion efficiency of the normal paraffin fuel which we use. By "combustion efficiency" we mean the per cent of fuel which is actually burned to produce heat of combustion rather than being decomposed by the heat of combustion.

We have discovered that the best operating results are obtained when operating a ram jet engine on a fuel which has a very rapid and stable combustion process. The fuel should also have a high heat release, for as the heat release of the fuel within the combustion chamber increases the greater is the temperature rise across the combustion chamber with the result that the thrust effect of the escaping gas is increased.

We have discovered that hydrocarbons which are not generally used as fuels for reciprocating internal combustion engines may be used with excellent effect in the operation of ram jet engines. Normal paraffins boiling in the range of between 90° F. and 500° F. have the characteristics of high heat release which we have found to be so desirable in ram jet fuels. In the operation of a ram jet engine it is preferred to use those normal paraffins which boil in the range of between 150° F. and 350° F. Normal paraffins boiling between 350° F. and 500° F. may be satisfactorily utilized as ram jet fuels by properly atomizing the fuel before its injection into the combustion chamber for burning. Normally liquid fuel is forced into the combustion chamber through a nozzle in such a manner that the fuel stream disintegrates into fine droplets which vaporize in turbulent boundary layers to form a combustible mixture.

With some of the newest designs proposed for continuous flow combustion engines, it is desirable that the fuel be admitted to the combustion chamber in the form of a gas. This may be done to obtain better mixing, greater turbulence, more stable flame holding areas, or even to take advantage of the ejector action of the high velocity gas stream. In such designs, the fuel is vaporized in a preheating chamber before being supplied to the combustion chamber. One engine which utilizes a prevaporizer coil has a fuel inlet temperature of about 60° F. and gas exit temperatures ranging from about 700° F. to 1500° F. with inlet pressures from 600 to 1000 pounds per square inch and exit pressures of 200 pounds per square inch. In such designs, coke deposition in the prevaporizer is a serious problem since the carbon laydown may eventually block the fuel passages or substantially decrease the efficiency of the prevaporizer.

We have found that normal paraffin type hydrocarbons undergo thermal decomposition in prevaporizer coils with a relatively small deposition of coke as compared with the heavy coke deposits which are formed when an olefinic type hydrocarbon fuel is used. Naphthene and aromatic type fuels are even more objectionable from the standpoint of coke deposition. For that reason, our paraffinic type hydrocarbon fuel which is described above is very desirable in those ram jet engines in which a prevaporization chamber is utilized.

For the most efficient ram jet engine operation, we have found that a fuel comprised essentially of a hydrocarbon stock which contains between 85 and 95 per cent by volume of normal paraffins boiling within our preferred boiling range are highly superior. A fuel comprising essentially a hydrocarbon stock and containing between 50 and 95 volume per cent normal paraffins boiling in the range of between 50° F. and 500° F. will also give superior performance.

The 50 to 95 volume per cent of hydrocarbons may be made up of mixtures of normal paraffins. It is preferred to provide a fuel which has a Reid vapor pressure which ranges between 1 and 10 pounds. A fuel having a Reid vapor pressure of 5 pounds may be obtained by mixing between 70 and 80 volume per cent of normal heptane with between 20 and 30 volume per cent normal pentane. A fuel having a Reid vapor pressure of 10 pounds may be prepared by mixing between 50 and 60 volume per cent normal pentane with between 40 and 50 volume per cent normal heptane.

In the operation of ram jet engines which do not utilize a prevaporization chamber, it is possible to vary the fuel so as to meet varying operational conditions. At times it may be necessary to operate such an engine for a comparatively long period of time though only a limited fuel capacity is available. Under such conditions, the desired length of time for operation of the ram jet engine, together with the shortage of fuel capacity space, may outweigh a desire for the highest efficiency of operation, in the determination of a fuel mixture for the engine. Aromatics or substituted aromatics boiling in the range of between 175° F. and 350° F. have a high heat release per unit volume. Inasmuch as it may be desirable to get the greatest economical amount of heat release from a limited fuel load, it may be desirable to mix selected aromatics boiling within the above boiling range with normal paraffins boiling within the above designated ranges. A fuel mixture which comprises essentially a hydrocarbon stock and containing between 50 per cent and 95 per cent by volume of normal paraffins boiling in the ranges of between 150° F. and 350° F. or 90° F. to 500° F. together with 5 per cent to 50 per cent by volume of aromatics boiling in the range of 175° F. to 350° F. provides a high ratio of heat release for a relatively small fuel volume.

Specific normal paraffins which may be utilized for at least 50 per cent by volume of the hydrocarbon stock of the fuel for a ram jet engine may include normal pentane, normal hexane, normal heptane, and normal octane. Aromatics, such as benzene and toluene and/or substituted aromatics, such as cumene, may make up the 5 to 50 per cent aromatic portion of the fuel volume.

It is preferred that the composite ram jet engine fuel contain substantially no isoparaffinic material. In view of the fact that it is practically impossible to eliminate all isoparaffins in commercial distillation systems, it will usually be found necessary, however, to tolerate up to about 10 per cent by volume of isoparaffins in the finished fuel. Other non-deleterious materials may also go to make up a portion of the finished fuel. Some materials which may be utilized with our preferred fuel are nitroparaffins, nitroaromatics, ketones, ethers, and alcohols. Such materials may make up as much as 30 per cent by volume of the finished material. It is preferred, however, to limit those materials to an amount not exceeding 10 per cent by volume of the finished fuel.

It is quite important when selecting a fuel for a ram jet engine to see that it has good initial starting characteristics. We have discovered that starting characteristics and thrust output of a given fuel may be improved by the addition of a small portion of peroxides which may include hydroperoxides. Examples of such additives are cumene hydroperoxide, benzoyl hydroperoxide, and ethyl hydroperoxide. The quantity of this type additive which may be advantageously employed may vary from about 0.1 per cent to about 5 per cent by volume of the finished fuel. It is preferred to utilize not more than 3 per cent by volume of the additive in the finished fuel because the relatively small incremental benefit for additions above 3 per cent becomes uneconomical.

We have further discovered that starting characteristics and thrust output of a given ram jet fuel may also be improved by the addition of a small portion of alkyl nitrates or alkyl nitrites. Examples of such additives are amyl nitrate, ethyl nitrate, isoamyl nitrate, isopropyl nitrate, cyclohexyl nitrate, hexyl nitrate, etc., or their corresponding nitrites. The quantity of this type additive which may be advantageously employed may vary from about 0.1 per cent to about 5 per cent by volume of the finished fuel. It is once again preferred to limit the quantity of the additive to not more than 3 per cent by volume of additive in the finished fuel because the relatively small incremental benefit for additions above 3 per cent. It is also possible to improve the starting characteristics of a given fuel by using a mixture of alkyl nitrates and peroxides in a quantity ranging between 0.1 per cent and 5 per cent by volume of the finished fuel.

Ram jet engines may be operated when the fuels discussed hereinbefore are supplied to a given combustion chamber at fuel-air ratios ranging between .01 and .10. It is within the scope of this invention to operate a ram jet engine with our preferred fuel mixed with oxygen. If oxygen or an oxygen supplying compound, such as peroxide, is used rather than another oxygen supply gas, such as air, the fuel-air ratios would necessarily have to be adjusted accordingly so as to maintain a fuel-oxygen ratio equivalent to the fuel-air ratio disclosed herein. It is preferred to operate a ram jet engine by supplying the above described fuel to the combustion chamber at a fuel-air ratio ranging between .03 and .07. Air is supplied to the combustion chamber at an inlet air pressure of between .5 and 40 atmospheres at a Mach number ranging between .1 and 1. "Mach number" is defined as the ratio of the velocity of a gas and the local velocity of sound in the gas. The preferable inlet air pressure ranges between 1 and 10 atmospheres at a Mach number ranging between 0.1 and 0.5. Fuel is supplied to the combustion chamber at a temperature ranging between −60° F. and 240° F. and preferably at a temperature ranging between 40° F. and 90° F. Air is supplied to the combustion chamber at a temperature between 90°

F. and 1040° F. and preferably at a temperature between 140° F. and 540° F. When operating a ram jet engine within the above ranges of conditions, our fuel burns within a combustion efficiency range of between 40 per cent and 100 per cent and ordinarily within the range of from 85 per cent and 100 per cent. The exact fuel-air ratio which is utilized is dependent upon the combustion stability of the fuel in the ram jet engine. Fuel injection temperatures are dependent upon the fuel characteristics such as freezing point and volatility characteristics, as well as upon the method of injection (liquid or vapor).

As pointed out above, emphasis has been directed to the design of ram jet engines so as to overcome the inherent combustion problems of conventional engines. We have operated two types of ram jet engines in the manner set forth above and have utilized three hydrocarbon fuels, one of which is the normal paraffinic hydrocarbon fuel which we utilize in the method of operation which is our invention. One ram jet engine to which we will hereafter refer as ram jet engine A had a uniplane triangular grid flame holder configuration with liquid fuel injection. The other ram jet engine to which we will hereafter refer as ram jet engine B had a multiplane triangular grid flame holder configuration with liquid fuel injection. Three fuels were used to operate each of the engines to determine the maximum thrust which is developed by the engine when being operated under the conditions set forth above. The physical and chemical properties of two of the fuels are set forth below as Table I.

TABLE I

|  | Blending Stocks | |
| --- | --- | --- |
|  | Isooctane | Normal Heptane |
| Purity, Percent | 97 | 97 |
| ASTM (Motor) Octane Number | 99.4 | 0.9 |
| Specific Gravity, 60F./60F | 0.6964 | 0.6882 |
| ASTM Gum, mgm | 0 | 0 |
| Reid Vapor Pressure, lbs | 1.75 | 1.50 |
| ASTM Distillation, F.: |  |  |
| IBP | 204 | 203 |
| 10% | 206 | 206 |
| 50% | 207 | 206 |
| 90% | 208 | 206 |
| DP | 208 | 210 |

Results of the operation of ram jet engine A with the fuels which are shown in Table I and with AN–F–48 grade 91/98 aviation gasoline are set forth in Table II below.

TABLE II

| Fuel | Maximum Net Thrust, lbs. | Inlet Velocity, M. P. H. | Fuel Flow Rotameter Reading | Thrust Specific Fuel Consumption, lb./lb./hr. |
| --- | --- | --- | --- | --- |
| 91/98 Aviation Gasoline | 6.75 | 235 | 17.2 | 37.8 |
| Do | 17.00 | 369 | 23.5 | 18.1 |
| Isooctane | 6.10 | 235 | 19.7 | 45.2 |
| Do | 14.75 | 370 | 21.5 | 19.6 |
| Normal Heptane | 7.00 | 235 | 23.2 | 43.6 |
| Do | 20.75 | 370 | 27.0 | 16.3 |

Results of the operation of ram jet engine B with the fuels which are shown in Table I and with AN–F–48 grade 91/98 aviation gasoline are set forth in Table III below.

TABLE III

| Fuel | Maximum Net Thrust, lbs. | Inlet Velocity, M. P. H. | Fuel Flow Rotameter Reading | Thrust Specific Fuel Consumption, lb./lb./hr. |
| --- | --- | --- | --- | --- |
| 91/98 Aviation Gasoline | 4.75 | 235 | 7.9 | 36.6 |
| Do | 13.70 | 369 | 17.6 | 18.8 |
| Isooctane | 5.10 | 235 | 5.10 | 29.4 |
| Do | 12.80 | 369 | 17.6 | 20.1 |
| Normal Heptane | 5.20 | 235 | 5.8 | 29.8 |
| Do | 15.00 | 369 | 17.1 | 17.0 |

It will be noted that the great difference in maximum thrust is obtained when the conditions of operation become increasingly severe. There is less difference in the maximum thrust developed while operating ram jet engine A with each of the three fuels at an inlet air velocity of 235 miles per hour with a .3 Mach number. The advantage of operating ram jet engine A with a normally paraffinic fuel as disclosed in the method of our invention becomes immediately evident upon examination of the results which were obtained under more severe operating conditions with an air inlet velocity of 370 miles per hour at a .5 Mach number. Normal heptane immediately displayed its superiority over 91/98 aviation gasoline and isooctane. The results of these operations of ram jet engine A are graphically displayed in Figure 1 of the drawing. The three fuels which were used in the operation of ram jet engine A were used in the operation of ram jet engine B. Once again it was found that the advantage of the normally paraffinic fuel was not immediately apparent when operating the engine at relatively mild operating conditions. When operating at the more severe operating conditions of 369 miles per hour at a .5 Mach number, however, the advantages became quite pronounced. The comparative results of the operations of ram jet engine B are graphically displayed in Figure 2 of the drawing.

The three fuels which were utilized in the operation of ram jet engines A and B are merely exemplary of general classes of materials which they represent. Each of the fuels boils within substantially the same boiling range and is believed to fall within a highly comparable group of fuels. The fuels having a Reid vapor pressure of 5 and 10 pounds, which were described above, were also used in the operation of ram jet engine A. The maximum thrust which was developed with the engine with those fuels was approximately 20 pounds.

As will be evident to those skilled in the art, various modifications of the invention can be made or followed in the light of the foregoing disclosure and discussion without departing from the spirit or scope of the disclosure.

We claim:

1. An improved method for operating a ram jet engine which comprises continuously injecting into a combustion chamber a fuel consisting essentially of a hydrocarbon stock having not more than 10 per cent by volume of isoparaffins and containing at least 50 per cent by volume normal paraffins boiling in the range of between 90° F. and 500° F. at a temperature between −60° F. and 240° F.; injecting air into the forward end portion of said combustion chamber at a Mach number between 0.1 and 1.00, at a pressure of between 0.5 and 40 atmospheres, at a temperature between 40° F. and 1040° F., and at a fuel-air ratio between 0.01 and 0.10; burning said fuel in said combustion chamber at a combustion efficiency within the range of from 40 per cent to 100 per cent so as to heat said air and resulting combustion gases; and exhausting said gases through a rearwardly extending exhaust duct at an exit velocity higher than the flying speed of said engine.

2. An improved method for operating a ram jet engine which comprises continuously injecting into a combustion chamber a fuel consisting essentially of a hydrocarbon stock having not more than 10 per cent by volume of isoparaffins and containing between 50 per cent and 95 per cent by volume normal paraffins boiling in the range of between 90° F. and 500° F. at a temperature between −60° F. and 240° F. with between 5 per cent and 50 per cent by volume aromatic hydrocarbons boiling between 175° F. and 350° F.; injecting air into the forward portion of said combustion chamber at a Mach number between 0.1 and 1.00, at a pressure of between 0.5 and 40 atmospheres, at a temperature between 40° F. and 1040° F., and at a fuel-air ratio between 0.01 and 0.10; burning said fuel in said combustion chamber at a combustion efficiency within the range of from 40 per cent to 100 per cent so as to heat said air and resulting combustion gases; and exhausting said gases through a rearwardly extending exhaust duct at an exit velocity higher than the flying speed of said engine.

3. The method of claim 1, wherein said normal paraffins boil between 150° F. and 350° F.; and injecting said fuel into said combustion chamber at a fuel-air ratio between .03 and .07.

4. The method of claim 1, wherein said normal paraffins consist essentially of 50 to 60 volume per cent normal pentane and 40 to 50 volume per cent normal heptane; and injecting said fuel into said combustion chamber at a fuel-air ratio between .03 and .07.

5. The method of claim 1, wherein said normal paraffins consist of normal heptane; and injecting said fuel into said combustion chamber at a fuel-air ratio between .03 and .07.

6. The method of claim 1, wherein said normal paraffins consist essentially of 70 to 80 volume per cent normal heptane and 20 to 30 volume per cent normal pentane; and injecting said fuel into said combustion chamber at a fuel-air ratio between .03 and .07

7. The method of claim 2, wherein said normal paraffins boil between 150° F. and 350° F.; and injecting said fuel into said combustion chamber at a fuel-air ratio between .03 and .07.

8. The method of claim 2, wherein said normal paraffins consist essentially of 50 to 60 volume per cent normal pentane and 40 to 50 volume per cent normal heptane; and injecting said fuel into said combustion chamber at a fuel-air ratio between .03 and .07.

9. The method of claim 2, wherein said normal paraffins consist of normal heptane; and injecting said fuel into said combustion chamber at a fuel-air ratio between .03 and .07.

10. The method of claim 2, wherein said normal paraffins consist essentially of 70 to 80 volume per cent normal heptane and 20 to 30 volume per cent normal pentane; and injecting said fuel into said combustion chamber at a fuel-air ratio between .03 and .07.

11. An improved method for operating a ram jet engine which comprises continuously injecting into a combustion chamber a fuel consisting essentially of a hydrocarbon stock having not more than 10 per cent by volume of isoparaffins and containing at least 50 per cent by volume normal paraffins boiling in the range of between 90° F. and 500° F., together with up to 5 per cent by volume of additive materials selected from the group consisting of alkyl hydroperoxides, aryl hydroperoxides, alkyl nitrates, and alkyl nitrites at a temperature between —60° F. and 240° F.; injecting air into the forward portion of said combustion chamber at a Mach number between 0.1 and 1.00, at a pressure of between 0.5 and 40 atmospheres, at a temperature between 40° F. and 1040° F., and at a fuel-air ratio between 0.01 and 0.10; burning said fuel in said combustion chamber at a combustion efficiency within the range of from 40 per cent to 100 per cent so as to heat said air and resulting combustion gases; and exhausting said gases through a rearwardly extending exhaust duct at an exit velocity higher than the flying speed of said engine.

12. The method of claim 1, wherein said air is injected into said combustion chamber at a velocity Mach number between 0.1 and 0.5, at a pressure between 1 and 10 atmospheres, at a temperature between 140° F. and 540° F., at a fuel-air ratio between 0.03 and 0.07; and said fuel is burned at a combustion efficiency within the range of from 85 per cent to 100 per cent.

13. The method of claim 11 wherein said additive materials are alkyl hydroperoxides.

14. The method of claim 11 wherein said additive materials are aryl hydroperoxides.

15. The method of claim 11 wherein said additive materials are alkyl nitrates.

16. The method of claim 11 wherein said additive materials are alkyl nitrites.

References Cited in the file of this patent

UNITED STATES PATENTS

| Number | Name | Date |
|---|---|---|
| 1,888,749 | Urquhart | Nov. 22, 1932 |
| 2,274,629 | Ellis | Feb. 24, 1942 |
| 2,455,205 | Whetstone | Nov. 30, 1948 |
| 2,479,470 | Carr | Aug. 16, 1949 |
| 2,534,309 | Sheffield | Dec. 19, 1950 |
| 2,563,305 | Britton et al. | Aug. 7, 1951 |

FOREIGN PATENTS

| Number | Country | Date |
|---|---|---|
| 554,906 | Germany | Nov. 2, 1932 |
| 439,805 | Great Britain | Dec. 6, 1935 |

OTHER REFERENCES

"The Journal of the Institute of Fuel," article by Watson, vol. 21, No. 116, October 1947, pages 1–34. (Copy in the Sci. Lib.)

"Jet Fuels for Aircraft" in "The Petroleum Engineer" for August 1948, pages 177, 180, 182, 185 and 186. (Copy in Div. 31, Class 196–150 AF.)